United States Patent [19]
Morcom

[11] 3,947,991
[45] Apr. 6, 1976

[54] FISHING TACKLE CONTAINER

[76] Inventor: Paul J. Morcom, Rte. No. 1, Box 235, Henderson, Tex. 75652

[22] Filed: Jan. 24, 1975

[21] Appl. No.: 543,879

[52] U.S. Cl. .............................. 43/54.5 R; 312/202
[51] Int. Cl.[2] ........................................ A01K 97/04
[58] Field of Search.... 43/54.5 R; 312/202, DIG. 33

[56] References Cited
UNITED STATES PATENTS

| | | | |
|---|---|---|---|
| 465,621 | 12/1891 | Westphal | 312/202 |
| 1,359,668 | 11/1920 | Buchenau | 43/54.5 R X |
| 3,188,157 | 6/1965 | Rand | 312/202 |

*Primary Examiner*—Hugh R. Chamblee
*Assistant Examiner*—Daniel J. Leach
*Attorney, Agent, or Firm*—Richards, Harris & Medlock

[57] ABSTRACT

A compartmentalized container for storing fishing lures and other fishing components including a housing having an opening on at least one side and a cut-out adjacent to the opening on the top of the housing. A plurality of horizontal circular trays are disposed within the housing in a superposed stacked relation. The trays are rotatable about a common vertical shaft within the housing, with each tray having a cut-out which matches the cut-out in the top of the housing. When the cut-outs in the trays are aligned with the cut-out in the housing, the walls of the trays completely close the opening in the side of the housing. Each of the trays may be rotated such that the contents of the trays are accessible through the cut-out in the top of the housing. In one embodiment, the container has a vertical aperture which allows the container to be mounted over the shaft supporting the seat in a fishing vessel. The storage container may be locked on a motorized fishing vessel having a key operated ignition. A locking mechanism is associated with the container and is activated to lock the container by sensing the removal of the key from the ignition. The container is automatically unlocked when the key is reinserted in the ignition. In another embodiment where the storage container is used on a non-motorized fishing vessel, the container is locked by mechanical means.

12 Claims, 11 Drawing Figures

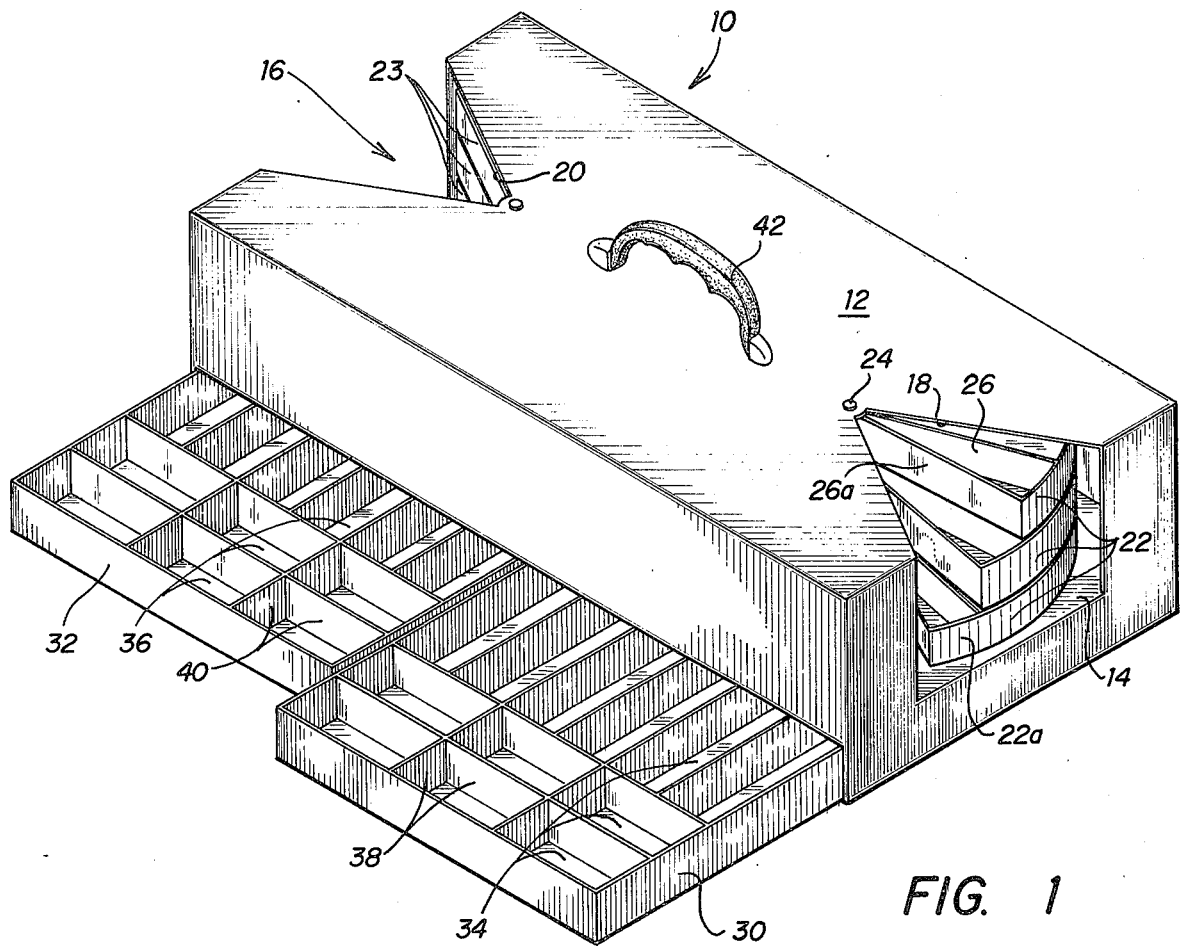
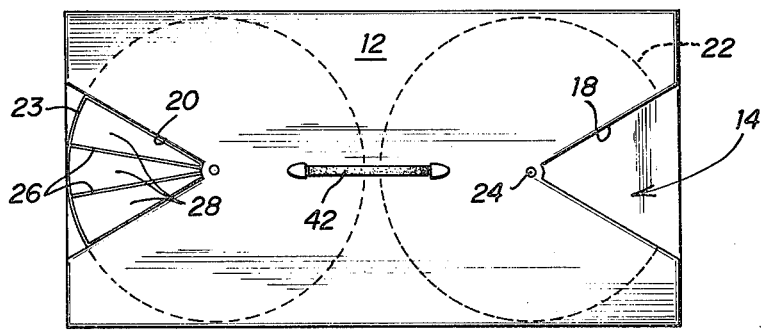
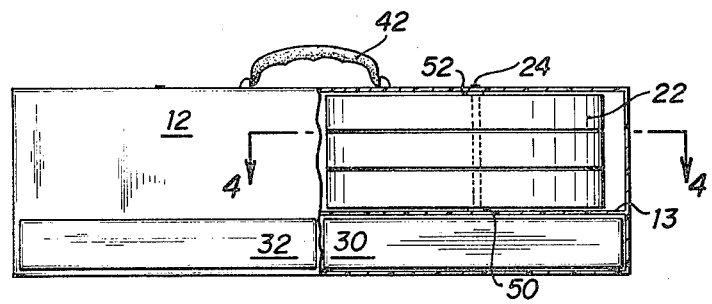

FISHING TACKLE CONTAINER

FIELD OF THE INVENTION

This invention relates to an apparatus for storing items for selective presentment, and more particularly to a compartmentalized fishing tackle box designed to facilitate the display and selection of lures and baits therefrom.

PRIOR ART

A primary goal in designing tackle boxes has been to provide a compact container which facilitates selection of fishing lures and components while providing an arrangement to eliminate entanglement between the various components. While attempting to achieve this goal, conventional tackle boxes have all suffered from several disadvantages. For example, prior tackle boxes often lack proper arrangement of the fishing lures and components to facilitate rapid selection of a particular component from the box and fail to provide proper accommodation for a large variety of lures, lines, hooks, plugs and the like. While entanglement of the various lures has been an inconvenience of conventional tackle boxes, excessive space requirement for opening and closing the tackle box has also been a major shortcoming of presently used tackle boxes.

Further, many previously developed tackle boxes unfold is such a manner as to make the box unstable. Where more lures and fishing components are stored in one section of the box than in another, this instability is amplified. Also, conventional fishing boxes are generally designed to expose all or a majority of the fishing components when opened, thereby exposing all of the elements to loss in the event that the box is accidentally dropped overboard into the water. These conventional designs also provide no buoyancy when dropped into the water, thereby allowing no chance of retrieving the tackle box or any of its contents in such an accident.

A need has thus arisen for a tackle container capable of accommodating a large number of fishing lures and components which are readily accessible to the fisherman. The container must be so designed to properly segregate the individual components to eliminate the inconvenience of having to separate entangled components and must likewise be capable of use in a limited space. The container must be stable both in its opened and closed position and should be sufficiently water tight to be somewhat buoyant in the event the box is dropped overboard into the water. The container should be designed to only limitingly expose the components in th fishing box in order to reduce the likelihood of loss of fishing components in the event the tackle box is dropped overboard. A need has also arisen for a technique for securely locking the tackle box when a boat is not in use, to eliminate the need of removing the fishing components from the boat after each use while preventing the theft of the components left with the boat.

SUMMARY OF THE INVENTION

In accordance with the present invention, a compartmentalized container includes a housing having an opening on one side and a cut-out adjacent thereto on the top of the housing. A plurality of horizontal trays are disposed within the housing in a superposed stacked relation. The trays are rotatable about a vertical axis within the housing and are formed to define a cut-out therein of matching size and shape as the cut-out in the top of the housing. The trays are so aligned that the cut-outs therein may be aligned with the cut-out in the housing. When the cut-outs in the trays are aligned with the cut-out in the housing, the walls of the trays completely close the opening in the side of the housing thereby sealing the housing. Each of the trays are compartmentalized to accept fishing lures and components and may be rotated individually about their axis to expose the fishing components in the trays as they pass below the cut-out in the housing.

In accordance with another aspect of the invention, a compartmentalized container includes a rigid shell housing having a first and second opening on opposite sides thereof and a cut-out adjacent each opening on the top of said housing. A first set of horizontal trays is disposed within the housing in a superposed stacked relation and is located at one end of the housing adjacent the first side opening. This first set of trays of rotatable about a vertical axis within the housing. Each tray is formed to define a cut-out therein of a size and shape corresponding to the cut-out adjacent the first opening. The trays are aligned so that the cut-outs therein may be aligned with the cut-out in the housing. A second set of horizontal trays is similarly disposed within the housing in a superposed stacked relation and located at the opposite end of said housing adjacent the second side opening. The second set of trays is rotatable within the housing and each tray has a cut-out therein corresponding to the cut-out adjacent the second opening in the housing. The second set of trays is aligned so that the cut-out in the trays may be aligned with the cut-out in the housing. Each tray is compartmentalized to accept fishing lures and components and may be rotated individually about its axis to expose the fishing components as they are rotated through the openings in the housing.

In accordance with another aspect of the invention, a system is provided for locking a storage container on a motorized fishing vessel having a key operated ignition. The locking system includes a lock means associated with the container for locking and unlocking the container. Circuitry for sensing the presence of the key in the ignition is provided, along with means responsive to the sensing means for unlocking the lock means upon sensing the key in the ignition. Thus, the storage container is unlocked by the insertion of the key in the ignition and is locked by the withdrawal of the key from the ignition.

In accordance with still another aspect of the invention, the storage container is adapted to be manually locked by mechanical means. This embodiment of the invention may be used to lock the container on a non-motorized fishing vessel or where the ignition activated locking system is inoperative.

In accordance with still another aspect of the invention, a compartmentalized container adapted to be secured to a vertical shaft seat support on a fishing vessel includes a rigid shell housing having an opening in one side thereof and a cut-out adjacent thereto on the top of the housing. The shell has a vertical aperture therethrough allowing the housing to be mounted upon the vertical shaft supporting the seat. A plurality of horizontal trays are disposed within the housing in a stacked relation and are rotatable about the vertical shaft. Each tray has a cut-out therein which matches in size and shape the cut-out in the top of the housing. The trays are so aligned that the cut-out in each tray may be aligned with the cut-out in the housing. By rotating the trays, so as to align the cut-out therein with the cut-out in the housing, the container is closed. The trays are divided into triangular compartments which house the various fishing lures and components. These components may be selectively withdrawn from the housing by the rotation of the tray and the withdrawal of the components as they appear below the cut-out in the housing.

DESCRIPTION OF THE DRAWINGS

For a more complete understanding of the present invention, and for further objects and advantages thereof, reference is now made to the following description taken in conjunction with the accompanying drawings in which:

FIG. 1 illustrates a prospective view of the preferred embodiment of the present invention;

FIG. 2 is a top view of the preferred embodiment illustrated in FIG. 1;

FIG. 3 is a partially cut away side view of the preferred embodiment illustrated in FIG. 1;

DESCRIPTION OF THE PREFERRED EMBODIMENT

Figure 4:
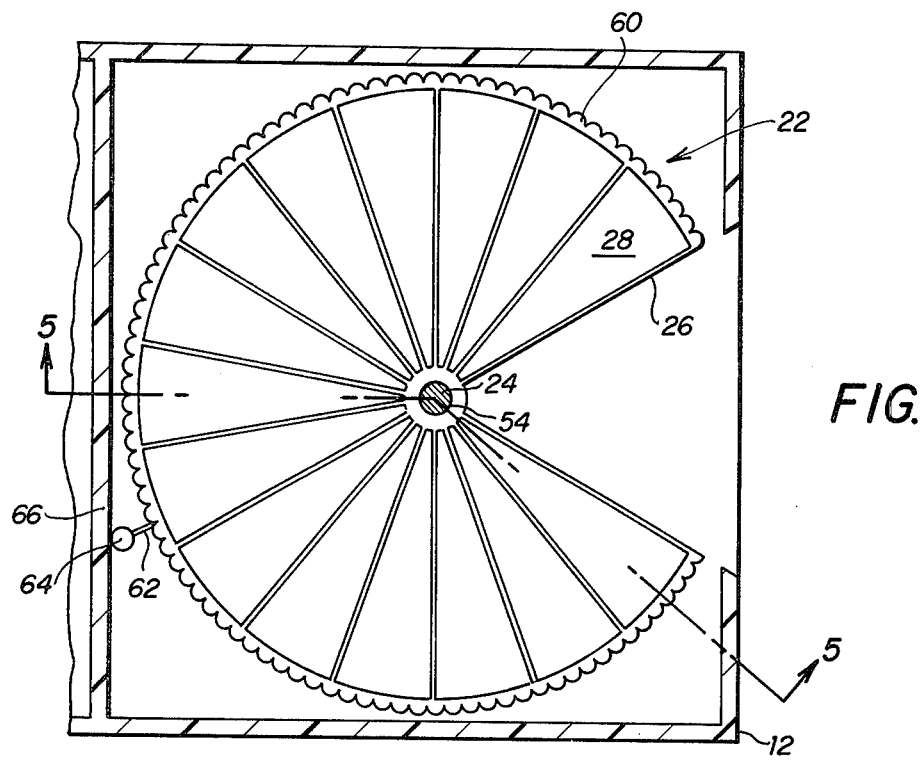
FIG. 4 is a partial sectional view taken along lines 4—4 in FIG. 3 looking in the direction of the arrows.

FIG. 1 illustrates a perspective view of a preferred embodiment of the fishing tackle box of the present invention. The tackle box 10 is composed of a rigid outer shell housing 12 having rectangular openings 14 and 16 in opposite sides of housing 12. The top of housing 12 further has a triangular cut-out section 18 adjacent side opening 14 and triangular cut-out 20 adjacent side openings 16. Positioned adjacent side opening 14 and top cut-out 18 are a plurality of circular trays 22 disposed in a superposed stacked relation for rotation relative to each other. As shown in FIGS. 1 and 3, trays 22 are supported by and rotatable about a common vertical shaft 24. Similarly, trays 23 are positioned adjacent side opening 16 and top cut-out 20 on the opposite side of housing 12. While the FIGURES herein show three trays superposed at each end of housing 12, the choice of three trays is for purposes of illustration only. The capacity of the tackle box may be readily increased or decreased by increasing or decreasing the number of trays used in the final configuration.

As is best seen in FIG. 1 and 2, trays 22 and 23 hae a cut-out therein corresponding in size and shape to the respective cut-outs in the top of housing 12. In the preferred embodiment illustrated in FIGS. 1 and 2, the cut-out 18 in the top of housing 12 is a 60° angle cut-out extending from the intersection of vertical shaft 24 with the top of housing 12. The cut-out in each of trays 22 is a 60° angle section extending from the point of rotation to the circumference. It will of course be understood that the size of the angle cut-outs may be varied according to desired capacity and operation. Trays 22 are further divided into compartments by section walls 26, thus providing for individual compartments 28 within the trays for separating fishing lures and other fishing components. In the preferred embodiment illustrated in FIGS. 1 and 2, the individual compartments 28 comprise equal arcs subtending an angle of 20° in the circular trays 22.

By rotating trays 22 about shaft 24, the individual compartments 28 are revealed as they pass before the opening 14 and cut-out 18 at the end of housing 12. The trays are so aligned that the cut-outs in the trays may be aligned with cut-out 18 in the top of housing 12. With the upper trays 22 so aligned, the lower tray 22a may be rotated, thereby revealing the compartments 28 and thus the components therein as the tray is rotated before opening 14 and cut-out 18 in the side of housing 12. Trays 23 on the opposite end of housing 12 may likewise be rotated to reveal the components in the individual compartments of trays 23.

When all of the trays adjacent opening 14 and adjacent opening 16 of housing 12 are positioned such that the cut-outs therein are aligned with the cut-out 18 in housing 12, the exterior walls 26a of the trays 22 completely close the opening in the side of housing 12 formed by opening 14 and cut-out 18. Trays 23 on the opposite side of housing 12 are shown closing the opening 16 in housing 12 by so aligning the cut-outs in each tray with cut-out 20 in the top of housing 12.

While the trays illustrated in FIGS. 1 and 2 are shown having equal compartment 28 formed by equal arcs subtending a 20° angle in trays 22, it is to be understood that trays 22 and 23 may be divided into sections of varying sizes to accommodate lures and fishing components of differing dimensions. However, sectioning of trays 22 and 23 such that a whole number of compartments 28 are revealed by the proper positioning of tray 22 at the cut-outs 18 and 20 is considered beneficial so that complete compartments may be viewed at a particular time and the total contents therein revealed.

Trays 22 are so positioned such that the bottom of center tray 22 serves as an effective lid for bottom tray 22 when the cut-outs in both trays are aligned. Similarly, top tray 22 serves as a lid for center tray 22 and the top of housing 12 serves as a lid for top tray 22. Therefore, the fishing lures or other fishing components in trays 22 are effectively locked within their particular compartment 28 when the trays 22 are in the closed position. In the event that tackle box 10 is turned over or otherwise upset, the design of the present invention prevents the components within the compartment 28 from falling out of the tackle box and from moving into an adjacent compartment 28 where the components could be entangled.

Further, the arrangement of trays 22 limits the possibility of loss of fishing components if the tackle box 10 is accidentally dropped overboard into the water. Because of the close interfitting between the trays and between housing 12 and the trays, the closed container, and even the container where one or more of the trays are not in the closed position, forms numerous air chambers within housing 12. If tackle box 10 accidentally falls into the water, it will tend to remain afloat for some time until water seeps into the individual compartments and interior of housing 12, thereby allowing time for the tackle box to be retrieved before sinking. Additionally, only a small portion of the contents of the tackle box are exposed to spillage at any time thereby limiting the loss in case of such an accident.

FIG. 1 further illustrates two lower sliding trays 30 and 32 having a plurality of compartments 34 and 36, respectively, formed by inner walls 38 and 40, respectively. Trays 30 and 32 are received into housing 12 at the lower side section thereof and rest below trays 22. The particular shape of the trays 34 and 36 illustrated in FIG. 1 are for purposes of illustration only and any size and shape of compartments may be chosen depending on the size of the baits and components to be housed by the trays. It has been found advantageous to have a number of long slender compartments in the back portion of trays 30 and 32 to accommodate artificial worms and similar long and narrow fishing components. Attached to the top of housing 12 is a handle 42 to facilitate handling of the tackle box.

Referring to FIG. 3, a vertical shaft 24 is secured by suitable means to the top of housing 12 and the intermediate floor 13. Spacers 50 and 52 positioned below and above trays 22 respectively provide sufficient clearance between trays 22 and housing 12. As is seen in FIG. 4, trays 22 have an aperture 54 in the center thereof to accept shaft 24. Aperture 54 is sized to allow free rotation of trays 22 about shaft 24.

FIG. 4 illustrates an alternative embodiment of the trays 22 which facilitates the control of the movement of trays 22 about shaft 24. Ribs 60 are formed vertically about the circumference of trays 22. Flexible tab 62 is attached to a vertical bar 64 which is in turn attached to housing rib 66. Tab 62 is adjusted by the rotation of bar 64 to apply a resisting pressure against ribs 60 to limit the rotation of trays 22. The pressure of tab 62 against rib 60 limits unwanted movement of trays 22 which could otherwise occur due to the movement of the tackle box with the fishing vessel in which the box is used. With the application of resisting pressure by tab 62, rotation of trays 22 will occur only when sufficient manual pressure is applied to the trays to overcome the resistance. Further, once the tray is positioned to the selected position, tab 62 will prevent the movement of the trays so that the selection of the lure or fishing component may be made.

Figure 5:
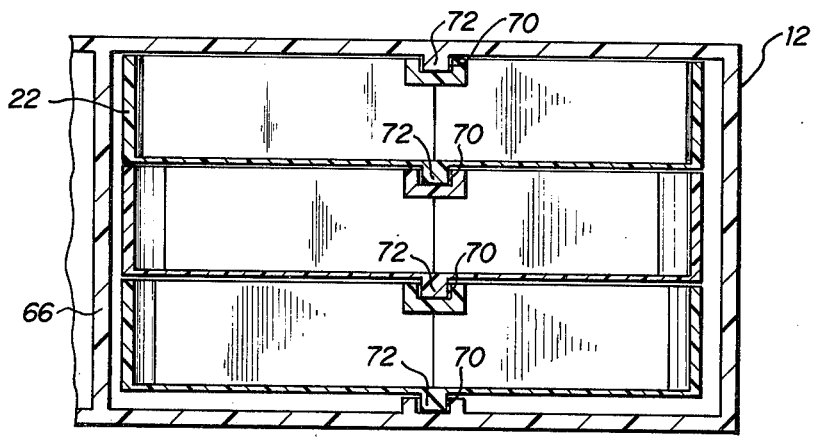
FIG. 5 is a sectional view taken along lines 5—5 in FIG. 4 looking in the direction of the arrows.

FIG. 5 illustrates an alternative to the use of vertical shaft 24 as the axis for rotation of trays 22. As is shown in FIG. 5, each tray 22 is formed with a circular top indention 70 in the top thereof at its point of rotation. Indention 70 mates with a corresponding circular protrusion 72 extending from the bottom of the adjacent tray. Protrusions 72 are formed slightly longer than the depth of indentions 70 to allow for clearance between the respective trays during rotation. In this way, trays 22 rotate relative to each other with the rotation of protrusion 72 within the mating indention 70 on the adjacent tray. Such an alternative design completely eliminates the need of a vertical shaft about which the trays rotate.

Figure 6:
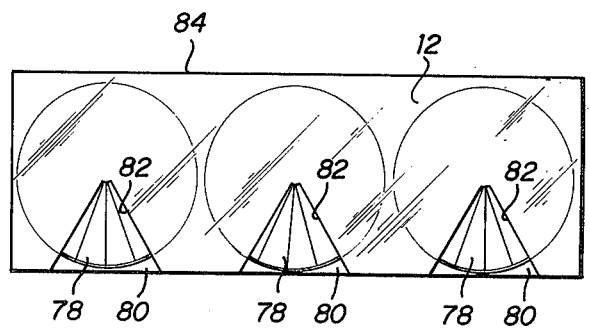
FIG. 6 is a top view of an alternative embodiment of the present invention.

FIG. 6 illustrates an alternative embodiment of the present invention wherein the openings 80 and adjacent cut-outs 82 in housing 12 are all on one side of the tackle box. Horizontal trays 78 are positioned adjacent openings 80 as previously described such that the cut-outs in trays 78 are alignable with the cut-outs 82 in housing 12. This configuration of the present invention provides a free side 84 opposite openings 80 in housing 12 such that the tackle box may be mounted against the boat wall for easier access to the fishing lures and components within the tackle box. Suitable attachment means may be provided on side 84 of housing 12 to allow for permanent or detachable mounting to the boat wall.

FIG. 6 further illustrates the construction of the housing 12 from a clear transparent material to further facilitate the selection of lures or components from the tackle box. By constructing the trays 78 out of similar transparent material, not only are the contents of the trays adjacent to the housing walls identifiable, but the total contents of each of the trays may be recognized prior to rotation of the trays.

Figure 7:
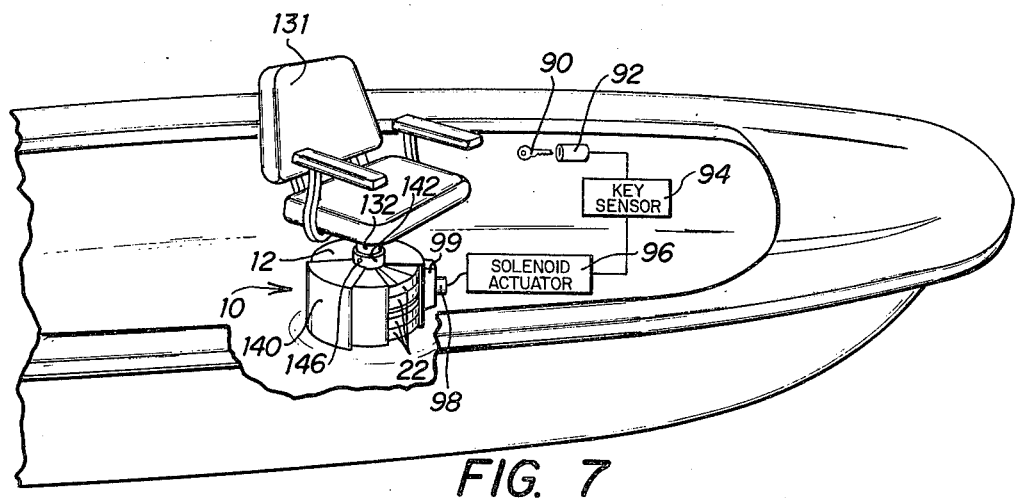
FIG. 7 illustrates a diagrammatic prospective view of the present invention at it is mounted on the vertical shaft seat support in a boat.
Figure 10:
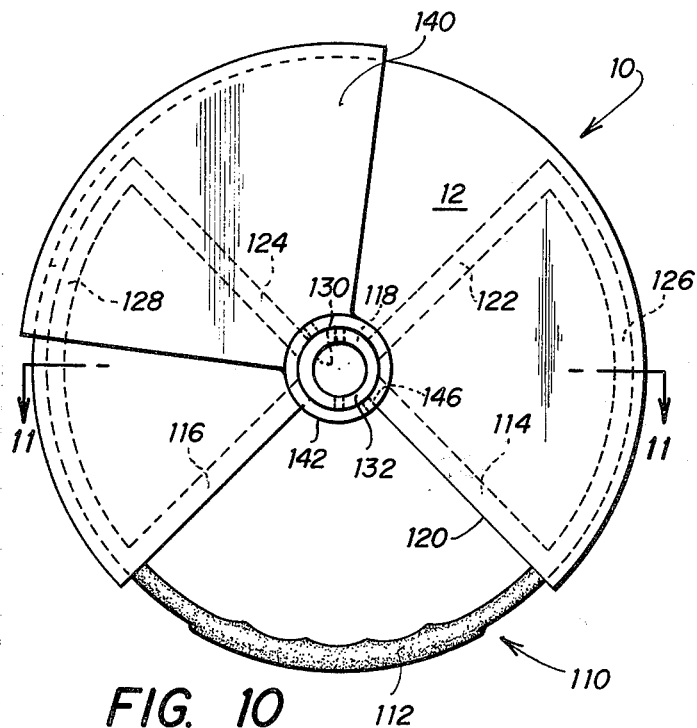
FIG. 10 is a top view partially cut away of the embodiment illustrated in FIG. 7.

FIGS. 7 and 10 illustrate the application of the present invention in a unique way to conserve space while utilizing a standard component on many vessels as a part of the apparatus. On many fishing boats, the boat seats are supported by a single vertical shaft attached to the bottom of the boat. In this embodiment of the invention, housing 12 is formed with a central aperture 130 to allow mounting of the housing upon the vertical shaft supporting seat 131 after removal of the seat. Similarly, trays 22 are disposed in a stacked relation within circular housing 12 and have an aperture therethrough for mounting on the vertical shaft. Each tray is rotatable about the shaft and has a cut-out defined therein which is alignable as described in the preceding embodiments with the cut-out in the top of housing 12.

Because it has been found to be advantageous for the opening in tackle box 10 to always be positioned directly between the seated fisherman's legs, the tackle box may be adapted to rotate with the seat so that the opening thereto is always positioned in line with the seat front. In this embodiment, housing 12 is adapted with a sleeve member 132 having an aperture therein aligned with the aperture 130 passing centrally through tackle box 10. Sleeve 132 is fixedly attached to the top of housing 12. With tackle box 10 and sleeve 132 positioned over the seat support shaft, the tackle box may be suspended from seat 131 by attachment of sleeve 132 to the underside of the seat. In this manner, housing 12 and enclosed trays 22 depend from the underside of seat 131 and rotate with it thereby always maintaining the alignment of the opening in housing 12 with the front of seat 131.

Figure 8:
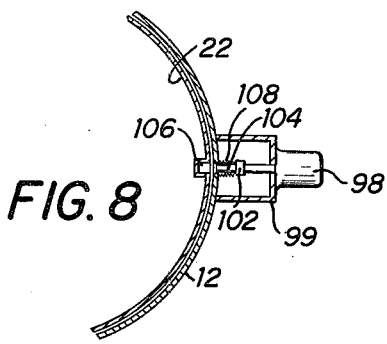
FIG. 8 is a top view of the locking mechanism used to lock the container of the present invention.
Figure 9:
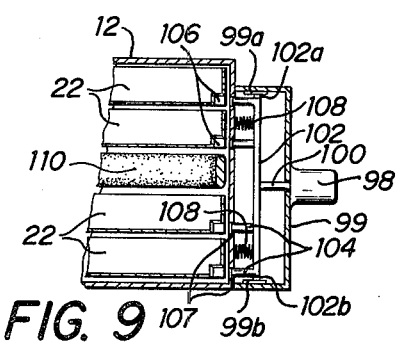
FIG. 9 is a side view of the locking mechanism shown in FIG. 8.

FIGS. 7, 8 and 9 illustrate a unique system for locking the tackle box 10 where the box is used on a motorized boat having a key operated ignition. Referring to FIG. 7, when key 90 is withdrawn from ignition 92, sensing device 94 relays a signal to actuator 96. Key sensor 94 may be any suitable device, such as a photoelectric or magnetic sensor, which identifies the presence of key 90 in ignition 92. When the key is withdrawn, actuator 96 causes an electrical current to be completed to solenoid 98 which is attached to the exterior shell of housing 12 by way of housing 99. As is seen in FIGS. 8 and 9, the actuation of solenoid 98 causes locking pin 100 to move against locking bar 102 thereby forcing it against the side walls of trays 22. Locking bar 102 is adapted with protrusions 104 which mate with indentions 106 in trays 22 to positively lock the trays in the closed position. Ends 102a and 102b of locking bar 102 are slidably engaged in slots 99a and 99b in housing 99 to guide bar 102 against trays 22. Protrusions 104 on bar 102 are slidably engaged in openings 107 in the side of housing 12. Openings 107 properly position protrusions 104 for engagement with indentions 106 in trays 22.

When key 90 is inserted into ignition 92 the solenoid actuator 96 is not activated and locking pin 100 is withdrawn into solenoid 98. Locking bar 102 is then moved away from trays 22 by compression springs 108 which normally urge locking bar 102 away from trays 22.

When key 90 is withdrawn in ignition 92 and the protrusions 104 and locking bar 102 are not properly aligned with the indentions 106 in trays 22 as when the trays 22 are not in their closed position, locking pin 100 will continue to urge locking bar 102 and protrusions 104 against trays 22. When trays 22 are moved such that protrusions 104 on locking bar 102 are aligned with indentions 106 in trays 22, trays 22 will be positively locked in their closed position.

FIG. 7 further illustrates a mechanical, manually operated locking mechanism for use on non-motorized fishing vessels or where the ignition operated locking system is inoperative. As is shown in FIG. 7, this mechanical locking system consists of a pivoting closure plate 140 which is rotatably supported above and below the tackle box 10. The closure plate 140 closely conforms to the cut-out in the top of the tackle box housing 12 and the opening in the side thereof and sufficiently overlaps these openings to prevent access into the tackle box when the closure plate is properly positioned over the openings. The closure plate 140 is rotatably supported above the tackle box by a collar 142 which surrounds sleeve 132. Collar 142 is adapted with a lock pin aperture 146 which may be aligned with apertures in both the seat support shaft and sleeve 132. The apertures in the collar, sleeve and shaft are aligned when the closure plate 140 completely covers the openings in the side and top of the tackle box housing 12. In this position, a locking pin may be inserted through the apertures and locked in position by conventional means not here shown. FIGS. 7 and 10 show the closure plate 140 positioned to the side of the side and top openings in the tackle box housing 12 and thus in the "opened" position.

FIG. 10 illustrates a handle 110 adapted for use with the circular design of the present invention. As is best seen in the partially cut-away view of FIG. 10, handle 110 includes the grip portion 112 attached to bracing members 114 and 116 which are joined at a hub element 118. The angle between bracing members 114 and 116 is equal to the angle of the cut-out 120 in the top of the container 12. Additional bracing members 122 and 124 are joined to hub 118 and are connected to bracing members 114 and 116 by connecting members 126 and 128 respectively. The angle between bracing members 122 and 124 is also equal to the angle of the cut-out 120 in the top of housing 12. Hub 118 has an aperture 130 therethrough which permits the handle 110 to rotate about the vertical seat support shaft. This design permits grip 112 of handle 110 to be positioned as shown in FIG. 10 to facilitate the mounting and removal of tackle box 10 from the vertical seat support shaft. With the removal of tackle box 10, handle grip 112 also serves as a means for carrying the tackle box.

Figure 11:
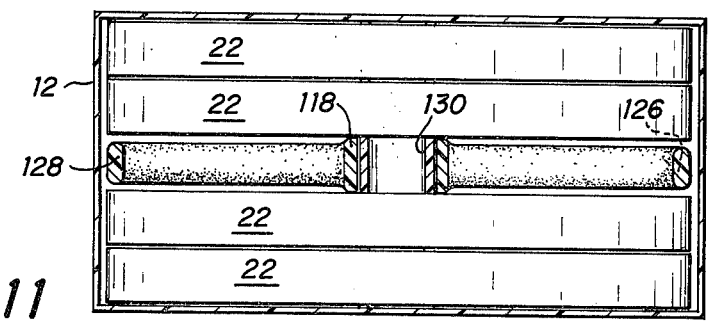
FIG. 11 illustrates a sectional view taken along lines 11—11 of FIG. 10 looking in the direction of the arrows.

During the use of the tackle box, handle grip 112 of handle 110 may be rotated within housing 12 such that the handle 110 is completely within housing 12. When in the stored position, handle 110 is completely removed from the cut-out area 120 and thus does not obstruct the selection of lures and other fishing components from trays 22 as they are rotated below cut-out 120. However, when the handle is in its stored position within housing 112, bracing members 122 and 124 are in line with the boundaries of cut-out 120 facilitating the retrieval of handle 110 from within housing 12. FIG. 11 illustrates that handle 110 is positioned intermediate of the trays 22 so that the tackle box is balanced about the handle to facilitate carrying.

It will thus be seen that the present invention discloses a new compartmentalized container for use in housing fishing lures and other components which overcomes the deficiencies heretofore existing in tackle boxes. The container includes a housing having an opening on one side and a cut-out adjacent thereto on the top of the housing. A plurality of horizontal trays are disposed within the housing in a superposed stacked relation and are rotatable about a vertical axis within the housing. The trays have a cut-out therein which matches the size and shape of the cut-out in the top of the housing. The trays are so aligned that the cut-outs therein may be aligned with the cut-out in the housing by rotating the trays. Thus, the trays may be rotated to reveal the contents therein or may be closed by aligning the cut-out in the trays with the cut-out in the housing. When in the closed position, the walls of the trays completely close the opening in the side of the housing.

The invention further discloses a system for locking the storage container on a motorized fishing vessel having a key operated ignition. The locking system includes a lock means associated with the container for locking and unlocking the container in response to a means for sensing the presence or absence of the key in the ignition. Thus, the storage container is unlocked by the insertion of the key in the ignition and is locked when the key is withdrawn from the ignition.

The invention further discloses a compartmentalized container to be secured to a vertical shaft seat support on a boat. A rigid shell housing having compartmentalized trays therein is designed with an aperture therethrough to allow the mounting of the container and trays about the vertical seat shaft. Selection of lures and other fishing components is made as the trays pass beneath a cut-out in the top of the container.

Thus, the present invention describes a compartmentalized container capable of completely segmenting the various fishing lures and other components while providing unlimited storage for such components. At the same time, the present invention also provides for quick access to all of the many components contained within the unit in such a way that the unit retains its stability at all times. With full access to each compartment from the top, each component may be readily withdrawn and inserted or clearly viewed for comparative selection. Additionally, the unit may be positively closed by merely rotating the compartmentalized trays to a predetermined position.

Whereas the present invention has been described with respect to specific embodiments thereof, it will be understood that various changes and modifications will be suggested to one skilled in the art, and it is intended to encompass such changes and modifications as fall within the scope of the appended claims.

What is claimed is:

1. A compartmentalized container comprising:

a housing having an opening on one side and a cut-out adjacent thereto on the top of said housing, and a plurality of horizontal trays disposed in a superposed stacked relation and rotatable about a vertical axis within said housing, each tray formed to define a cut-out therein of matching size and shape as the cut-out in the top of said housing and aligned so that the cut-outs in said trays may be aligned with the cut-out in said housing, wherein the walls of said trays completely close the opening in the side of said housing when the cut-outs in said trays are aligned with the cut-out in said housing and wherein each of the trays may be selectively rotated about said vertical axis such that the contents therein are accessible through the opening in the side and the cut-out in the top of said housing.

2. The container of claim 1 wherein all of said trays rotate about a common vertical axis.

3. The container of claim 2 and further comprising a vertical shaft secured in said housing for rotatably supporting said trays.

4. The container of claim 2 wherein each of said trays is adapted with a circular protrusion extending from the bottom thereof at the rotational axis of said tray, and wherein each of said trays is formed with a corresponding circular indention in the top thereof, with a diameter larger than the diameter of said protrusion and shallower than the height of said protrusions such that the protrusions from the bottom of said trays rotatably interfit with the indentions in the tops of the adjacent trays thereby providing for rotation of one tray relative to an adjacent tray without interference between said protrusions and indentions and without interference between the bottoms of said trays and the tops of adjacent trays thereto 5. A compartmentalized container comprising:
a housing having an opening on one side and a cut-out adjacent thereto on the top of said housing,
a plurality of horizontal trays disposed in a superposed stacked relation and rotatable about a vertical axis within said housing, each tray formed to define a cut-out therein of matching size and shape as the cut-out in the top of said housing and aligned so that the cut-outs in said trays may be aligned with the cut-out in said housing, wherein the walls of said trays completely close the opening in the side of said housing when the cut-outs in said trays are aligned with the cut-out in said housing and wherein each of the trays may be selectively rotated about said vertical axis to expose the contents therein, and
a handle member interposed between said trays and rotatable about said vertical axis, said handle member being selectively positionable so that no portion thereof is exposed in said cut-out in said housing to thereby avoid interference between said handle member and said trays when said handle member is not in use.

6. The container of claim 1 wherein said cut-out in said housing is triangular in shape and said cut-outs in said trays are triangular in shape, and
said trays have triangular compartments formed therein, said compartments being smaller in size than said cut-out in said housing such that an entire compartment may be revealed through the cut-out in said housing by the rotation of said trays about said vertical axis.

7. A compartmentalized container comprising:
a housing having an opening on one side and a cut-out adjacent thereto on the top of said housing, and
a plurality of horizontal trays disposed in a superposed stacked relation and rotatable about a vertical axis within said housing, each tray formed to define a cut-out therein of matching size and shape as the cut-out in the top of said housing and aligned so that the cut-outs in said trays may be aligned with the cut-out in said housing, wherein the walls of said trays completely close the opening in the side of said housing when the cut-outs in said trays are aligned with the cut-out in said housing and wherein each of the trays may be selectively rotated about said vertical axis to expose the contents therein and wherein said horizontal trays are formed with a plurality of vertical indentions along the outer perimeter, and
a flexible member positioned against said indentions along the outer perimeter of said trays to restrict the rotation of said trays and allow rotation thereof only when sufficient force is applied to said trays to overcome the resistance applied by said flexible member.

8. A compartmentalized container for fishing lures comprising:
a rigid shell housing having first and second openings on opposite side thereof and cut-outs adjacent each of said openings on the top of said housing,
a first set of horizontal trays disposed in a superposed stacked relation within said housing and located at one end of said housing adjacent said first side opening,
a second set of horizontal trays disposed in a superposed stacked relation within said housing and located at the opposite end of said housing adjacent said second side opening,
said first set of trays being rotatable about a vertical axis within said housing and each tray having a cut-out therein of a size and shape corresponding to the cut-out adjacent said first opening, said first set of trays aligned so that the cut-outs in said first set of trays may be aligned with the corresponding cut-out in said housing,
said second set of trays being rotatable about a vertical axis within said housing and each tray having a cut-out therein of a size and shape corresponding to the cut-out adjacent said second opening, said second set of trays aligned so that the cut-outs in said second set of trays may be aligned with the corresponding cut-out in said housing.

9. The container of claim 8 wherein the walls of said first set of trays close said first opening when the cut-outs in said first set of trays are aligned with the corresponding cut-out in said housing, and
wherein the walls of said second set of trays close said second opening when the cut-outs in said second set of trays are aligned with the corresponding cut-out in said housing.

10. The container of claim 9 wherein said trays are circular in shape with equal radii and with each tray rotatable about the center thereof.

11. A compartmentalized container for fishing lures comprising:
a rigid shell housing having at least two openings on one side thereof and a cut-out adjacent each opening on the top of said housing, two sets of horizontal trays disposed in a superposed stacked relation, each set being rotatable about a vertical axis within said housing with one set located adjacent each opening in said housing, said trays formed to define a cut-out therein of matching size and shape as the adjacent cut-out in the top of said box and aligned so that the cut-outs in said trays may be aligned with the adjacent cut-out in said housing by the rotation of said trays within said housing.

12. The container of claim 11 and further comprising:

means on the side of said housing opposite said openings in said housing for mounting said housing.

* * * * *

UNITED STATES PATENT OFFICE
CERTIFICATE OF CORRECTION

Patent No. 3,947,991  Dated  April 6, 1976

Inventor(s)  Paul J. Morcom

It is certified that error appears in the above-identified patent and that said Letters Patent are hereby corrected as shown below:

```
Col. 1, line 52, "th" should be --the--.
Col. 2, line 19, "of" (second occurrence) should be --is--.
Col. 3, line 30, "at" should be --as--;
        line 65, "hae" should be --have--.
Col. 10, line 28, "side" should be --sides--.
```

Signed and Sealed this

Thirteenth Day of July 1976

[SEAL]

Attest:

RUTH C. MASON
*Attesting Officer*

C. MARSHALL DANN
*Commissioner of Patents and Trademarks*